US012322293B2

(12) United States Patent
Schäfer et al.

(10) Patent No.: US 12,322,293 B2
(45) Date of Patent: Jun. 3, 2025

(54) APPARATUSES AND METHODS FOR COLLISION AVOIDANCE

(71) Applicant: Sony Group Corporation, Tokyo (JP)

(72) Inventors: Henrik Schäfer, Stuttgart (DE); Kirk Scheper, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 266 days.

(21) Appl. No.: 18/008,984

(22) PCT Filed: Jun. 18, 2021

(86) PCT No.: PCT/EP2021/066628
§ 371 (c)(1),
(2) Date: Dec. 8, 2022

(87) PCT Pub. No.: WO2021/259797
PCT Pub. Date: Dec. 30, 2021

(65) Prior Publication Data
US 2023/0222928 A1 Jul. 13, 2023

(30) Foreign Application Priority Data
Jun. 25, 2020 (EP) .................................... 20182168

(51) Int. Cl.
*G01S 5/16* (2006.01)
*G01S 5/00* (2006.01)
(Continued)

(52) U.S. Cl.
CPC .............. *G08G 5/80* (2025.01); *G01S 5/0045* (2013.01); *G01S 5/0072* (2013.01); *G01S 5/16* (2013.01);
(Continued)

(58) Field of Classification Search
CPC .... G08G 5/045; G08G 5/0069; G01S 5/0045; G01S 5/0072; G01S 5/16; G01S 11/12
See application file for complete search history.

(56) References Cited

U.S. PATENT DOCUMENTS

2017/0146659 A1* 5/2017 Kovermann ......... G05D 1/0236
2018/0267663 A1* 9/2018 Cho ........................ G01S 11/12
(Continued)

FOREIGN PATENT DOCUMENTS

DE     102015220377 A1 *  4/2017    ............... G01S 1/70
DE     102015226015 A1 *  6/2017
(Continued)

OTHER PUBLICATIONS

Milde, M. B., et al. (2017). Obstacle avoidance and target acquisition for robot navigation using a mixed signal Analog/Digital neuromorphic processing system. Frontiers in Neurorobotics, https://doi.org/10.3389/fnbot.2017.00028. (Year: 2017).*
(Continued)

*Primary Examiner* — Daniel M. Robert
(74) *Attorney, Agent, or Firm* — XSENSUS LLP

(57) ABSTRACT

The present disclosure relates to a collision avoidance concept comprising emitting a modulated light beacon from an object, wherein a luminance of the light beacon is modulated based on a useful signal carrying information on a position of the object, detecting, by an event-based vision sensor of a vehicle, the modulated light beacon of the object and outputting an event signal in response to a detected change in luminance of the modulated light beacon, and estimating a distance between the object and the vehicle based on the event signal.

20 Claims, 14 Drawing Sheets

(51) Int. Cl.
  *G01S 11/12* (2006.01)
  *G08G 5/55* (2025.01)
  *G08G 5/57* (2025.01)
  *G08G 5/80* (2025.01)

(52) U.S. Cl.
  CPC ............... *G01S 11/12* (2013.01); *G08G 5/55* (2025.01); *G08G 5/57* (2025.01)

(56) References Cited

U.S. PATENT DOCUMENTS

| | | | |
|---|---|---|---|
| 2018/0273201 A1* | 9/2018 | Sabe | G03B 15/05 |
| 2018/0350098 A1* | 12/2018 | Siessegger | G06T 7/70 |
| 2020/0012829 A1* | 1/2020 | Davidson | G05D 1/0234 |
| 2020/0265590 A1* | 8/2020 | Daniilidis | G06T 7/269 |
| 2021/0018627 A1* | 1/2021 | Plank | G01S 11/12 |
| 2022/0139084 A1* | 5/2022 | Mandelli | G06F 3/03545 |
| | | | 382/103 |
| 2022/0197312 A1* | 6/2022 | Vemprala | G05D 1/0088 |
| 2024/0103166 A1* | 3/2024 | Ichiki | G01S 17/58 |

FOREIGN PATENT DOCUMENTS

| | | |
|---|---|---|
| EP | 3155494 B1 | 4/2019 |
| JP | 2004101616 A | 4/2004 |

OTHER PUBLICATIONS

Khyam, Mohammad Omar et al. "Neuromorphic Computing for Autonomous Mobility in Natural Environments." Proceedings of the 7th Annual Neuro-Inspired Computational Elements Workshop. New York, NY, USA: ACM, 2019. 1-7. (Year: 2019).*

Censi et al., "Low-latency localization by active LED markers tracking using a dynamic vision sensor," 2013 IEEE/RSJ International Conference on Intelligent Robots and Systems, Tokyo, Japan, 2013, pp. 891-898, doi: 10.1109/IROS.2013.6696456. (Year: 2013).*

International Search Report and Written Opinion mailed on Sep. 15, 2021, received for PCT Application PCT/EP2021/066628, filed on Jun. 18, 2021, 9 pages.

* cited by examiner

APPARATUSES AND METHODS FOR COLLISION AVOIDANCE

CROSS-REFERENCE TO RELATED APPLICATIONS

The present application is based on PCT filing PCT/EP2021/066628, filed Jun. 18, 2021, which claims priority to EP 20182168.3, filed Jun. 25, 2020, the entire contents of each are incorporated herein by reference.

FIELD

The present disclosure generally relates to apparatuses and methods for collision avoidance and, more particularly, to apparatuses and methods for collision avoidance based on specific information about objects, such as vehicles or building, conveyed by modulated light.

BACKGROUND

There is an expected increase in the number of Unmanned Aerial Vehicles (UAVs), which are also commonly referred to as drones. Many of those might fly autonomously and might have to rely on both, an external traffic management system, as well as on-board sensors for environment detection. To efficiently use the available airspace and minimize the risk of collisions, both between the UAVs, between UAVs and manned aviation, and between UAVs and tall structures, a collision avoidance system is necessary.

A system based on external route management and collision avoidance is critically dependent on the availability of external infrastructure and connectivity. Radio frequency (RF) transmissions can be prone to interference and in case of a failure of the infrastructure or connectivity, the whole system may be broken. Also, the number of participants is limited by the bandwidth of the RF transmission system.

A passive sensing system using cameras to detect other UAVs is crucially dependent on the light conditions and requires high processing power to detect possible collisions.

Active sensors in the radio spectrum, e.g. mm-wave Radar, have relatively low lateral resolution and are also prone to interference. Also, the detection of other UAVs or structures is highly dependent on their material and construction and thus unpredictable.

Thus, there is a demand for reliable collision avoidance systems.

SUMMARY

This demand is addressed by apparatuses and methods in accordance with the independent claims. Possibly advantageous embodiments are addressed by the dependent claims.

According to a first aspect, the present disclosure proposes an apparatus comprising a light source configured to emit a light beacon, a modulator circuit coupled to the light source and configured to modulate a luminance (brightness) of the light beacon based on a modulating useful signal carrying information about the object, and an event-based vision sensor configured to output an event signal in response to a detected change in luminance. In other words, it is proposed to use modulated light, encoding information of the sender, in combination with an event-based vision sensor capable of decoding the information.

According to a further aspect, the present disclosure proposes a collision avoidance system. The system comprises an object which includes a light source configured to emit a light beacon and modulator circuitry coupled to the light source and configured to modulate a luminance of the light beacon based on a modulating useful signal carrying information about the object. The system further comprises a vehicle which includes an event-based vision sensor configured to output an event signal in response to a detected change in luminance of the modulated light beacon and processing circuitry configured to estimate a distance between the object and the vehicle using the event signal.

According to yet a further aspect, the present disclosure proposes collision avoidance method, the method comprising emitting a modulated light beacon from an object, wherein a luminance of the light beacon is modulated based on a useful signal carrying information on a position of the object, detecting, by an event-based vision sensor of a vehicle, the modulated light beacon of the object and outputting an event signal in response to a detected change in luminance of the modulated light beacon, and estimating a distance between the object and the vehicle based on the event signal.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
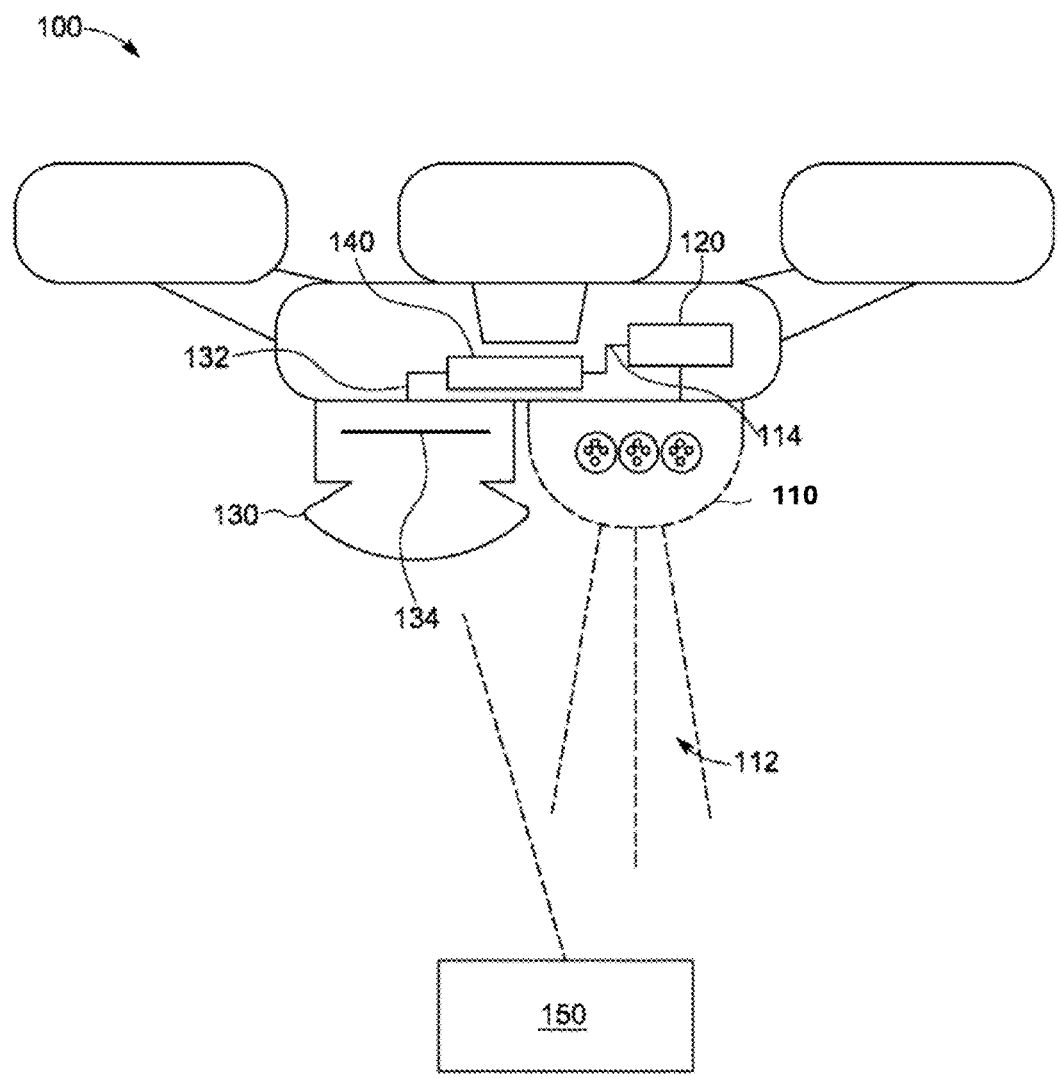
FIG. 1 shows an apparatus/object for collision avoidance in accordance with the present disclosure.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 schematically illustrates an object or apparatus 100 in accordance with the present disclosure. The object can generally be any movable (dynamic) or stationary object. Examples of movable objects are cars, UAVs (e.g., drones), ships, airplanes, and the like. Examples of stationary objects are buildings, mountains, or other stationary natural (tall) objects. In the illustrated example of FIG. 1 the object 100 is a drone (UAV).

Object 100 comprises a light source 110 (also sometimes referred to as beacon in the sequel) which is configured to emit a light beacon 112. Light beacon 112 can be received or reflected by another (remote) object 150. Object 100 further comprises a modulator circuit 120 coupled to the light source 110 and configured to modulate a luminance/brightness of the light beacon 112 based on a modulating useful (message) signal 114 carrying information about the object 100. Object 100 further comprises an event-based vision sensor 130 configured to output an event signal 132 in response to a detected change in luminance/brightness, e.g. of a light beacon received via event-based vision sensor 130. The light beacon received via event-based vision sensor 130 can be a reflected own light beacon or another light beacon transmitted from another object 150. In other words, it is proposed to use modulated light 112, encoding information of the object 100, in combination with an event-based vision sensor 130 capable of decoding such information.

Event-based vision sensors 130, also referred to as event cameras or dynamic vision sensors, are bio-inspired sensors that differ from conventional frame cameras: Instead of capturing images at a fixed rate, they may asynchronously measure per-pixel brightness changes, and output a stream of events that encode the time, location and sign of the brightness changes. In some embodiments, the event-based vision sensor 130 may thus comprise a two-dimensional (2D) pixel array 134 configured to measure per-pixel luminance/brightness changes. Pixels in the event-based vision sensor 130 may work independently and asynchronously. Whenever one of the pixels observes a significant change in intensity, it may output an ON or OFF event along with the position of the sensing pixel. An ON event stands for sensing an increasing change of luminance, whereas an OFF event stands for a decreasing change. Those pixels without significant change of intensity may trigger no output at all. Event cameras may offer attractive properties compared to traditional cameras: high temporal resolution (in the order of µs), very high dynamic range (e.g., 140 dB vs. 60 dB), low power consumption, and high pixel bandwidth (on the order of kHz) resulting in reduced motion blur.

In some embodiments, the light source 110 may be configured to emit infrared (IR) and/or ultra-violet (UV) light. Both types of light are outside the visible spectrum for humans. Infrared light is electromagnetic radiation (EMR) with wavelengths longer than those of visible light. IR wavelengths extend from the nominal red edge of the visible spectrum at 700 nanometers (frequency 430 THz), to 1 millimeter (300 GHz). The light source 110 may thus comprise one or more infrared light-emitting diodes (LEDs), for example. Ultraviolet is a form of electromagnetic radiation with wavelength from 10 nm (with a corresponding frequency of approximately 30 PHz) to 400 nm (750 THz), shorter than that of visible light but longer than X-rays. The light source 110 may thus additionally or alternatively comprise one or more UV-LEDs, for example.

Thus, the event-based vision sensor 130 may be sensitive to IR- and/or UV-light. For example, the event-based vision sensor 130 may include a bandpass filter to extract wavelengths of IR or UV light sources used in a positioning/collision avoidance system in accordance with the present disclosure.

In some embodiments, the light source 110 may be configured to emit the light beacon 112 in a predefined direction and/or with a predefined shape. For example, one or more reference points of the object 100 may be indicative of a reference orientation of the object 100. The light beacon 112 may be emitted in a predefined direction with respect to this reference orientation (e.g., with a certain angular offset with respect to the objects' reference orientation). The light beacon 112 may be a light beam being a directional projection of light energy radiating from the light source 110. To artificially produce a light beam, one or more LEDs and a parabolic reflector may be used, for example. In other embodiments, a predefined beam divergence larger than 0° may be desired. The beam divergence may reach from 0° to 180° or even up to 360°. For precision navigation in very close range (e.g. landing, maneuvering closely around structures), the light beacons 112 of stationary objects may have a specific shape that allows the estimation of distance and orientation of the beacon for example through machine vision (e.g. an arrow of a specified size, pointing north). This way, a single beacon can be used for precision navigation.

Figure 2A:
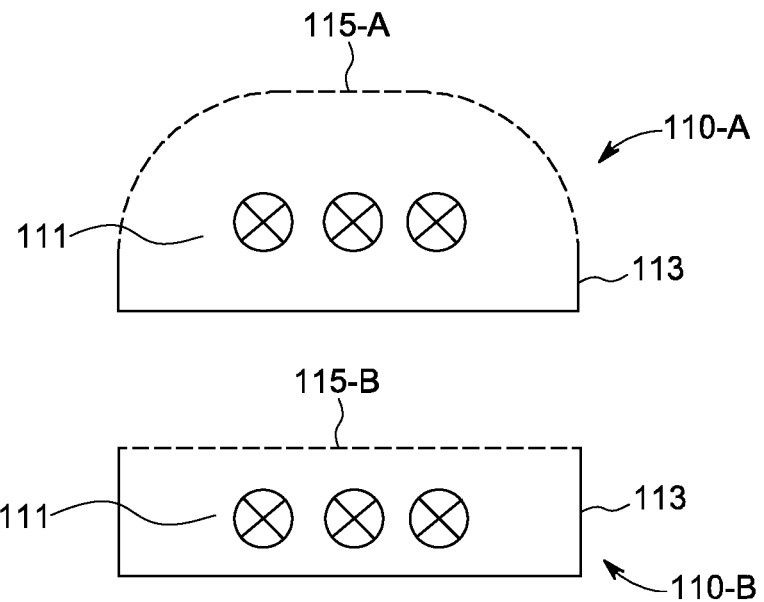
FIG. 2A, B light sources and event-based vision sensors in accordance with the present disclosure.

FIG. 2A schematically illustrates two examples of light sources 110-A and 110-B.

Each light source 110-A and 110-B comprises a plurality of LEDs or laser diodes 111. The plurality of LEDs or laser diodes 111 are embedded in a housing 113, which may have a reflective interior coating, for example. Light source 110-A comprises imaging optics in form of a semispherical diffusor 115-A for better visibility from a sideway position. Light source 110-B comprises imaging optics in form of a flat diffusor 115-A for better directivity.

Figure 2B:
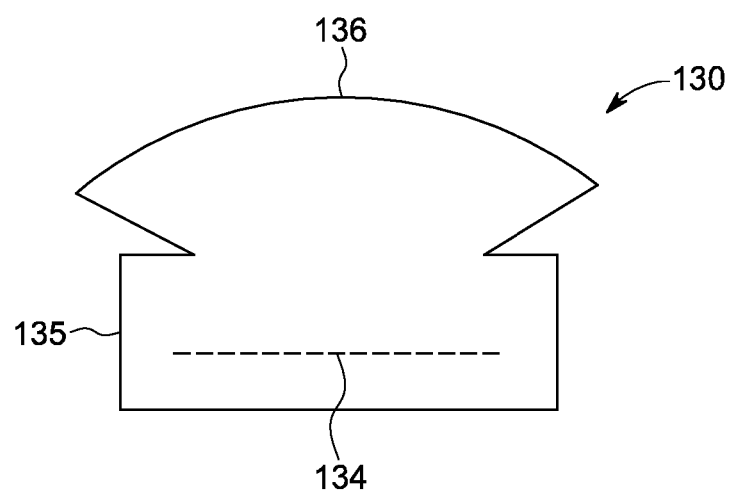

FIG. 2B schematically illustrates an example of an event-based vision sensor 130 comprising imaging optics 136 (e.g. one or more lenses), a 2D sensor array 134 integrated in a housing 135. As mentioned before, 2D event-based vision sensor array 134 comprises a 2D-array of pixels. Whenever one of the pixels observes a significant change in intensity, it may output an ON or OFF event along with the position of the sensing pixel. The position of the sensing pixel may then be indicative of a position of the observed object/event relative to the event-based vision sensor 130.

In some embodiments, the modulator circuit 120 may be configured to modulate the amplitude or duration of light emitted by the light source 110 in accordance with the modulating useful (message) signal 114. For this purpose, modulator circuit 120 may control electrical control signals of the light source 110 in accordance with the useful (message) signal 114. Amplitude modulation (A) is a modulation technique used in communications, commonly for transmitting information via a carrier wave (here: light wave). In amplitude modulation, the amplitude (signal strength) of the carrier wave is varied in proportion to that of the message signal (useful signal) being transmitted. Pulse-width modulation (P), or pulse-duration modulation (PDM), can be used to reduce an average power delivered by an electrical or light signal, by effectively chopping it up into discrete parts. The average value of voltage (and current) fed to the load (light source 110) can be controlled by turning a switch between supply and load on and off at a rate in accordance with the message signal (useful signal) being transmitted.

In some embodiments, the information about the object 100 may comprise information on the type of object, for example whether the object is a stationary object (e.g. building) or moving object (e.g. UAV). Additionally, or alternatively, the information about the object 100 may comprise a unique identifier (ID) of the object. The identifier may be a word, number, letter, symbol, or any combination of those. Additionally, or alternatively, the information about the object 100 may comprise information on a (geographic) location of the object. A geographic coordinate system is a coordinate system that enables every location on Earth to be specified by a set of numbers, letters or symbols. The coordinates may be chosen such that one of the numbers represents a vertical position and two or three of the numbers represent a horizontal position; alternatively, a geographic position may be expressed in a combined three-dimensional Cartesian vector. A co on choice of coordinates may be latitude, longitude and elevation. Additionally, or alternatively, the information about the object 100 may comprise a motion vector of the object. The motion vector can be a three-dimensional vector that provides an offset between two successive coordinates of the object 100, for example. If the object is stationary, its motion vector is zero. If the object moves in constant height, for example, its motion vector may be two-dimensional.

The information about the object 100 may then be decoded at another (remote) object by using the event-based vision sensor of the other object.

Figure 3:
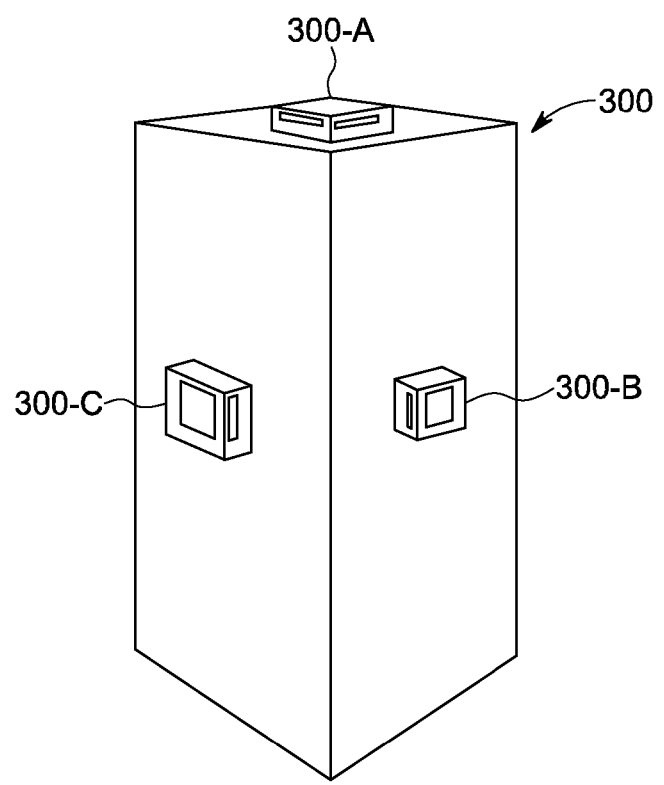
FIG. 3 illustration of an example beacon positioning on buildings.

FIG. 3 shows an illustration of an example beacon apparatus positioning on buildings 300.

In the illustrated example, beacon apparatuses 300-A, 300-B, 300-C are installed on different sides of building 300. Each apparatus 300-A, 300-B, 300-C comprises a light source (not explicitly shown) configured to emit a respective light beacon and a modulator circuit (not explicitly shown) coupled to the light source and configured to modulate a luminance/brightness of the light beacon based on a modulating useful signal carrying information about the respective apparatus 300-A, 300-B, 300-C and/or the building 300. For example, the information about the respective apparatus 300-A, 300-B, 300-C may comprise information on the building 300 and/or a geographic location and/or orientation (e.g., top surface, south surface, west surface, . . . ) of the respective apparatus 300-A, 300-B, 300C. The (positional) information about the apparatuses 300-A, 300-B, 300-C and/or building 300 may then be used by object 100 for positioning or navigating, for example.

In some embodiments, the object 100 may thus further comprise processing circuitry 140 (see FIG. 1) which is configured to estimate a distance between another observed object 150, 300 whose modulated light beacon is detected by the object's 100 event-based vision sensor 130, wherein the processing circuitry 140 uses the event signal 132 in response to the detected modulated light beacon. Based on the detected event signal, the useful signal and hence information on the position and/or the motion vector of the observed object 150, 300 can be decoded and compared with the object's 100 own position and/or motion vector. For example, the processing circuitry 140 may be configured to estimate the distance between the object 100 and the observed object 150, 300 based on the object's 100 motion vector and the observed object's 150 angular velocity observed by the event-based vision sensor 130. The higher the angular velocity is, the shorter may be the distance.

In some embodiments, the processing circuitry 140 may be configured to extract information about at least one observed object 150, 300 from the 2D event signal 132, wherein the information about the observed object 150, 300 comprises information on an absolute position of the observed object 150, 300, and to estimate an absolute position of the object 100 using the absolute position of the at least one observed object 150, 300 and a line of sight between the object 100 and the observed object 150, 300. The line of sight can e.g. be determined based on the observed object's 150, 300 angular position vis-à-vis the object. This angular position can be observed by the 2D event-based vision sensor 130. Whenever one of the pixels observes a significant change in intensity, it may output an ON or OFF event along with the position of the sensing pixel. The position of the sensing pixel may then be indicative of a relative position of the observed object 150, 300 with respect to the object 100.

In some embodiments, the processing circuitry 140 may be configured to compare the absolute position and/or a motion vector extracted from the information about the observed object 150, 300 with the observed object's 150, 300 relative position and/or motion vector observed via the 2D event-based vision sensor 130 relative to the object's 100 own position. This means that the observed (remote) object's transmitted absolute position/motion vector may be compared against a relative position/motion vector observed by the object's 2D event-based vision sensor 130. Based on the object's 100 own position/motion vector and the observed object's 150, 300 relative position/motion vector, the processing circuitry 140 can estimate the observed object's 150, 300 absolute position/motion vector and compare it against the information extracted from the observed object's 150, 300 modulated light beacon. The purpose of this plausibility check may be to detect false objects, for example reflected or defective/sabotaged beacons.

In some embodiments, the processing circuitry 140 may be configured to estimate a location of a passive object based on detected reflections of the object's 100 own modulated light beacon. Here, "passive object" refers to an object not having an own light source. In principle, the reflections of the object's 100 own modulated light beacon detected by the 2D event-based vision sensor 130 can be treated similarly to light beacons received from other active objects. Here, "active object" means an object with an own light source. Whenever one of the pixels observes a significant change in intensity, it may output an ON or OFF event along with the position of the sensing pixel. The position of the sensing pixel may then be indicative of a relative position of the observed passive object with respect to the object 100. By decoding the reflected light beam, the object 100 can identify (e.g., by looking at the decoded ID) that it is its own reflected light beam. As mentioned before, the object's 100 own position/motion vector may be required to estimate the absolute position of the reflector (passive object).

The concept described herein cannot only be used for positioning of the object 100 and other objects, but also for collision avoidance between moving objects and other obstacles.

Figure 4:
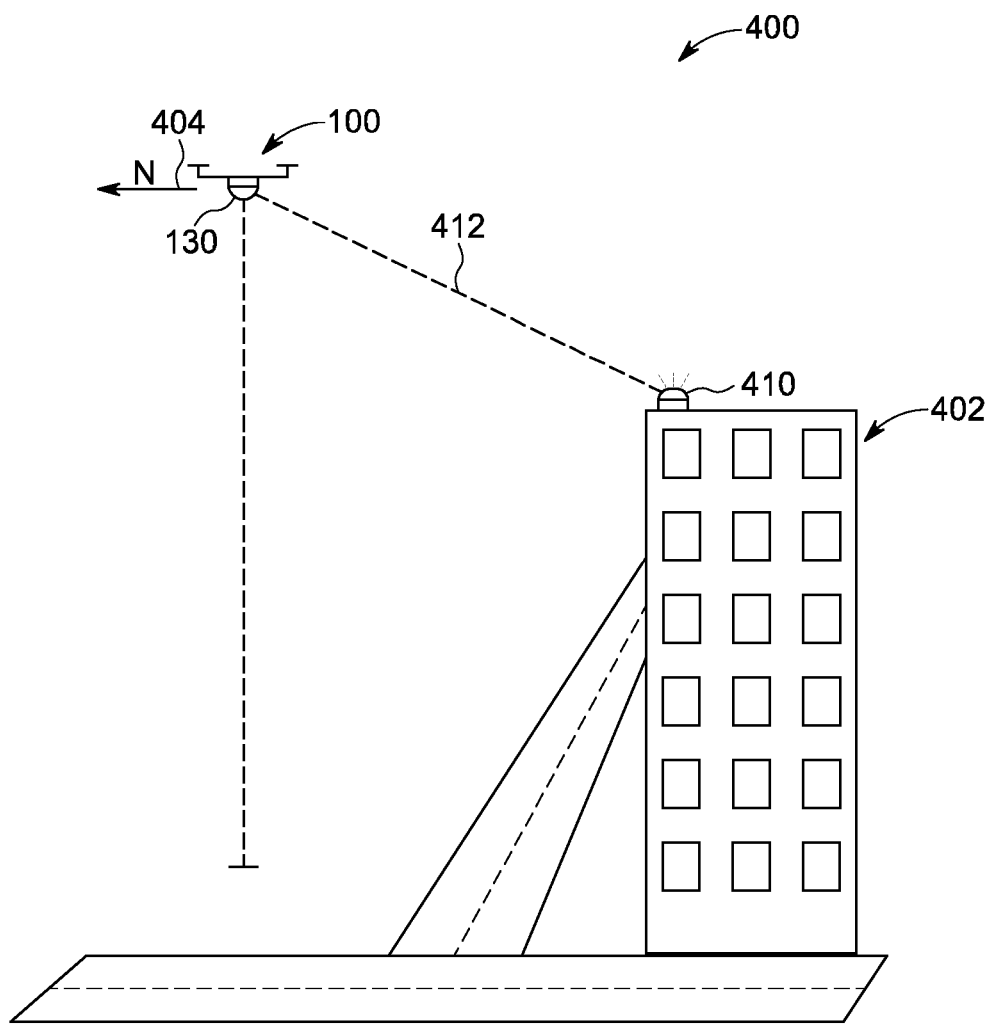
FIG. 4 illustrates a first collision avoidance system in accordance with the present disclosure.

FIG. 4 illustrates a collision avoidance system 400 in accordance with the present disclosure.

Collision avoidance system 400 comprises an object 402 (here: building) having a light source 410 configured to emit a light beacon 412 and having modulator circuitry (not shown) coupled to the light source 410 and configured to modulate a luminance/brightness of the light beacon 412 based on a modulating useful signal carrying information about the object 402. The system 400 further comprises a vehicle 100 (e.g., a UAV) comprising at least an event-based vision sensor 130 which is configured to output an event signal in response to a detected change in luminance/brightness of the modulated light beacon 412. The vehicle 100 further comprises processing circuitry (not shown) configured to estimate a distance between the object 402 and the vehicle 100 using the event signal. The skilled person having benefit from the present disclosure will appreciate that the illustrated objects 100, 402 are mere examples and that any other movable (dynamic) or static objects are conceivable.

The vehicle's 100 processing circuitry may be configured to determine the position of the object 402 based on the (2D) event signal and to estimate a distance between the object 402 and the vehicle 100 based on the position of the object 402 and a (estimated) current position of the vehicle 100. The position of the vehicle 100 can be estimated based on built-in satellite navigation (GSNN) sensors or based on estimating the position of the vehicle 100 using the collision avoidance system 400 itself. Here, the position of the vehicle 100 can be estimated using lines of sight to different objects in the field of view of 2D event-based vision sensor and triangulation, for example.

FIG. 4 illustrates an example of positioning based on a radial vector (line of sight) to a stationary object 402, the orientation of the vehicle 100 relative to the horizon and magnetic North 404 and the altitude 406 of the vehicle 100. As mentioned before, the radial vector can be obtained from the position of the sensing pixel(s). The vehicle 100 can then estimate its own position (using triangulation techniques) based on the radial vector to object 402, known altitude 406, and known orientation. The vehicle's 100 own estimated position may then be compared to the position of the stationary object 402 (e.g., communicated via the modulated light beacon 412). Thus, if only one stationary object is in line of sight, the vehicle's position can still be determined using the vehicle's attitude 406 and its orientation relative to the horizon and magnetic North 404.

Figure 5:
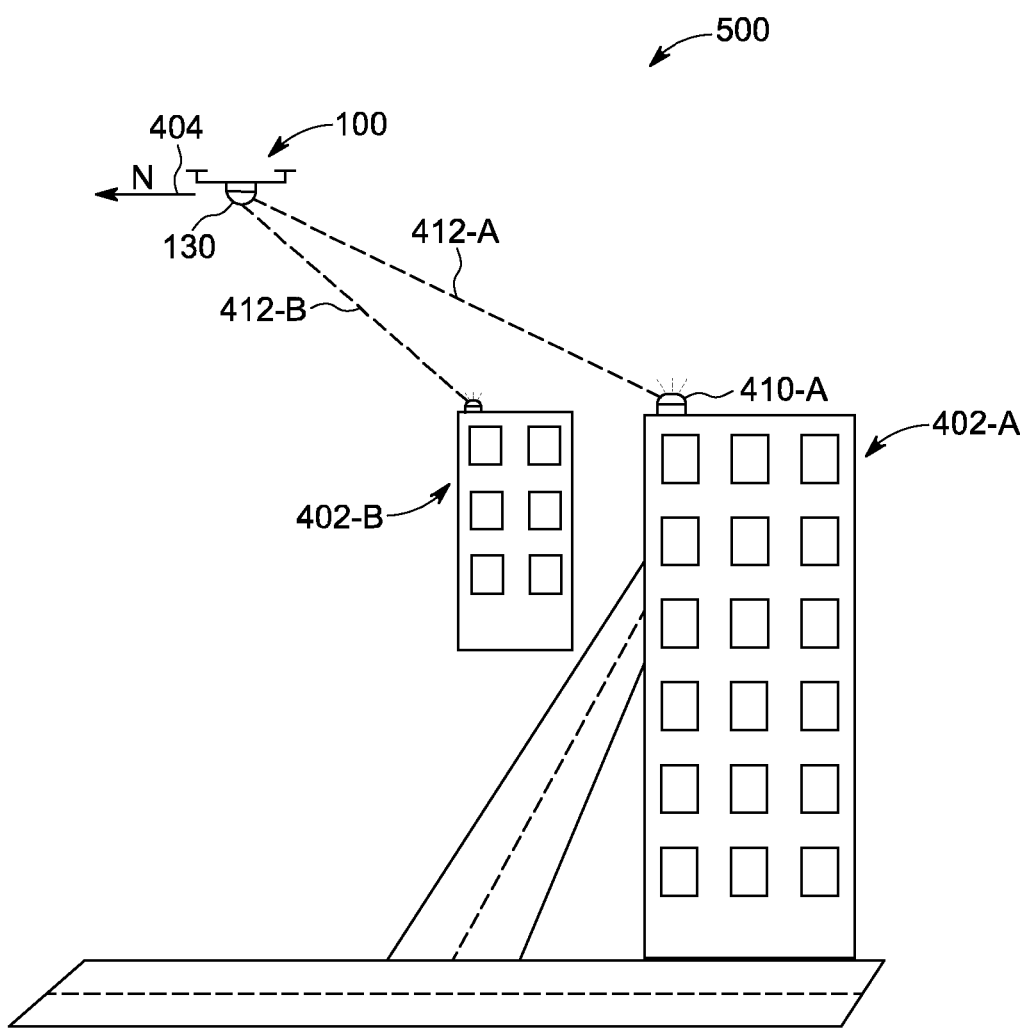
FIG. 5 illustrates a second collision avoidance system in accordance with the present disclosure.

FIG. 5 illustrates an example positioning based on radial vectors to two stationary objects 402A, 402-B and the orientation of the vehicle 100 relative to the horizon and magnetic North 404. The radial vectors to the stationary objects 402A, 402-B can be observed by the vehicle's 100 2D event-based vision sensor given known orientation of the vehicle 100 relative to the horizon and magnetic North 404. The vehicle's 100 processing circuitry may be configured to determine its own position based on triangulation. The vehicle's 100 own position may then be compared to the positions of the stationary objects 402A, 402-B (communicated via the respective modulated light beacons). Thus, if only two objects are in sight, the vehicle's position can be determined from triangulation with the addition of the vehicle's absolute heading.

Figure 6:
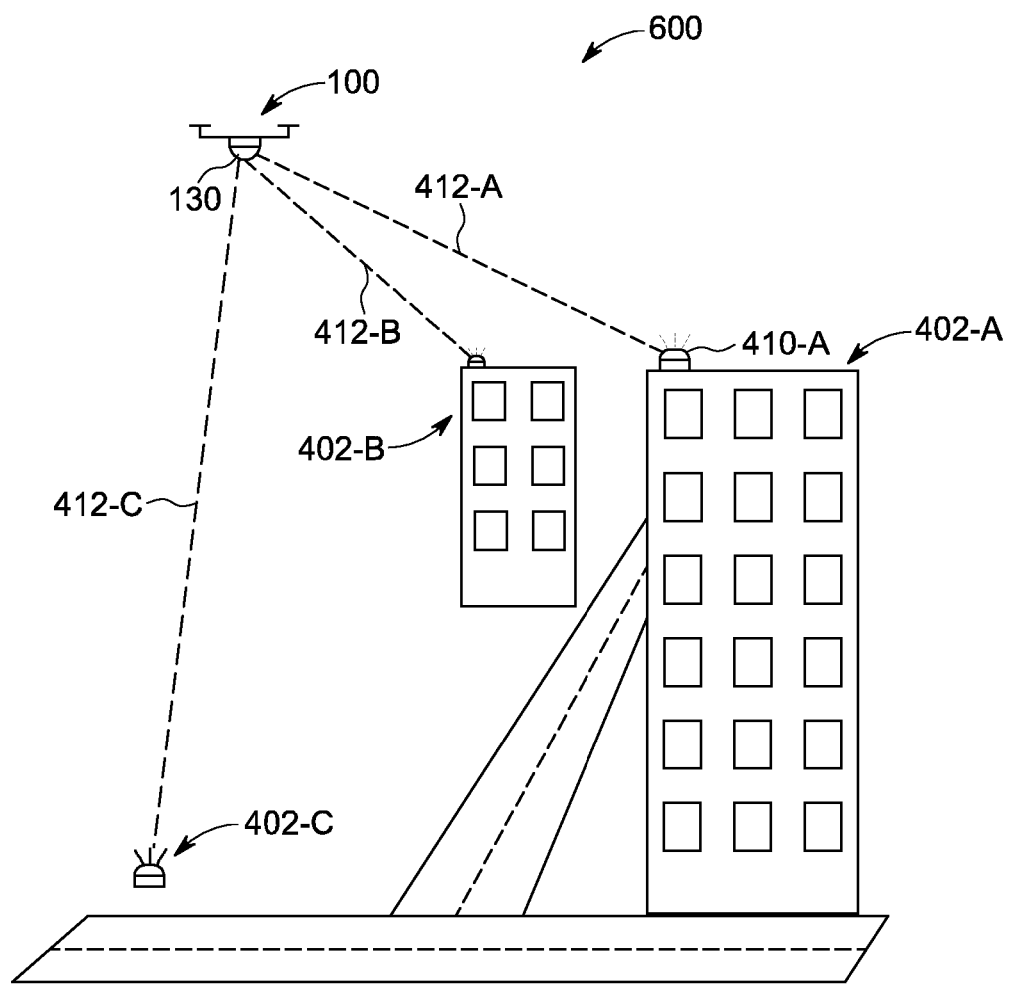
FIG. 6 illustrates a third collision avoidance system in accordance with the present disclosure.

FIG. 6 illustrates an example positioning based on the radial vector to three stationary objects 402A, 402-B, 402-C. The radial vectors to the stationary objects 402A, 402-B, 402-C can be observed by the vehicle's 100 2D event-based vision sensor. The vehicle's 100 processing circuitry may be configured to determine its own position based on triangulation. The vehicle's 100 own position may then be compared to the positions of the stationary objects 402A, 402-B, 402-C (communicated via the respective modulated light beacons). Thus, if three stationary objects are in sight, the position can be determined easily from triangulation.

In some embodiments related to collision avoidance, the vehicle's 100 processing circuitry 140 may be further configured to initiate a collision avoidance maneuver in case the estimated distance to another (remote) object falls below a threshold. That is, the vehicle 100 may change its course of movement (change of motion vector) to avoid colliding with another object.

Thus, the present disclosure proposes the use of time modulated (invisible) light, encoding information of the sender, in combination with a 2D event-based vision sensor, capable of decoding the information (e.g. a DVS or event sensor). The optical transmission can be in the near infrared range (e.g. 905 nm), where the natural sunlight has a very low intensity at some wavelengths. LEDs or laser diodes can be used to broadcast the following information:

For UAVs, for Example:
1. Type of beacon (UAV)
2. Position of beacon (top, bottom, front, rear, left, right).
3. ID of object (unique ID, registered in a database)
4. 3-dimensional motion vector (speed and direction of movement)

For Stationary Objects, for Example:
1. Type of beacon (stationary)
2. Position of beacon (top, bottom, side (north, south, east, west))
3. ID of object
4. 3-dimensional position of beacon.

Figure 13A:
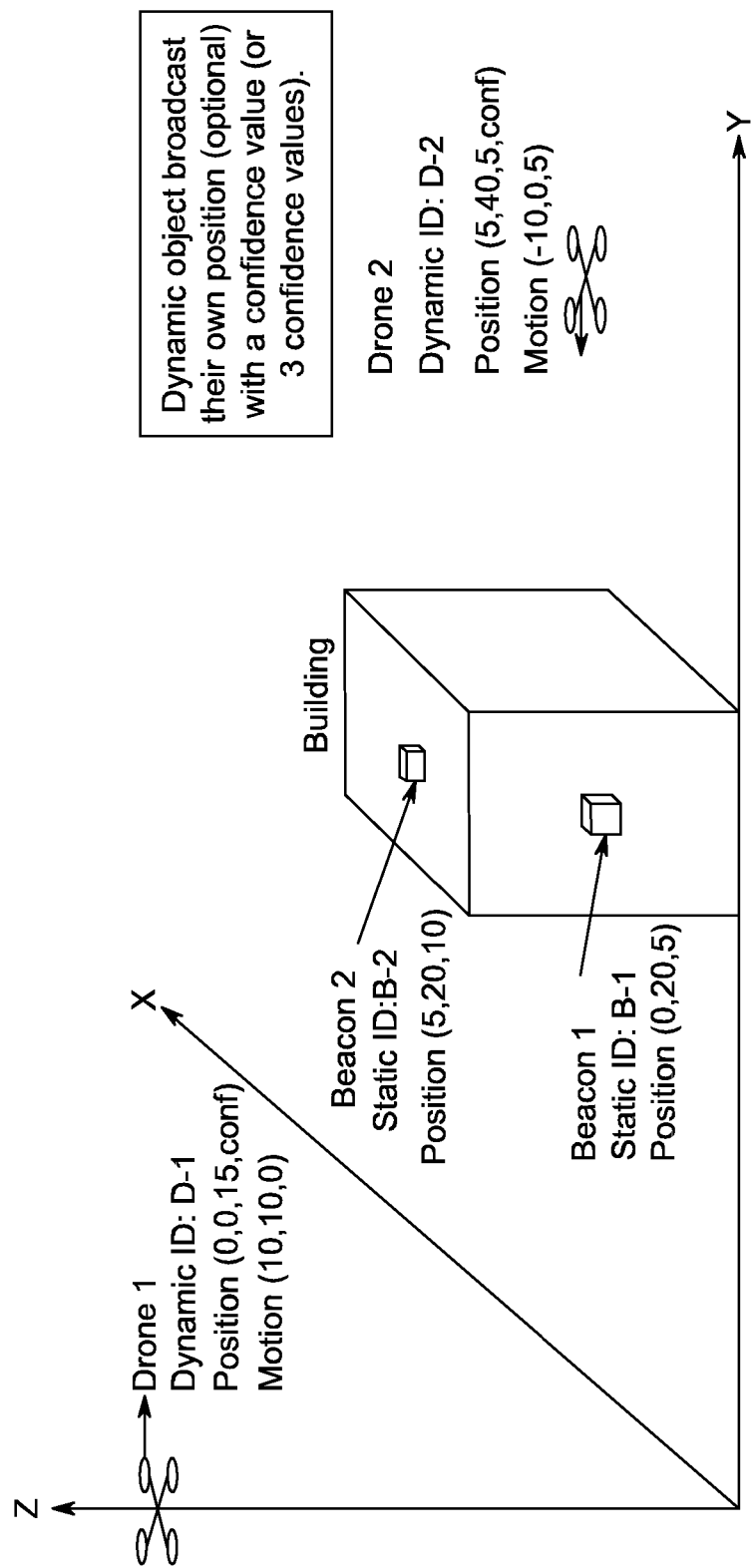
FIG. 13A, B show examples of object information that can be transmitted from static and dynamic objects via respective modulated light beacons.
Figure 13B:
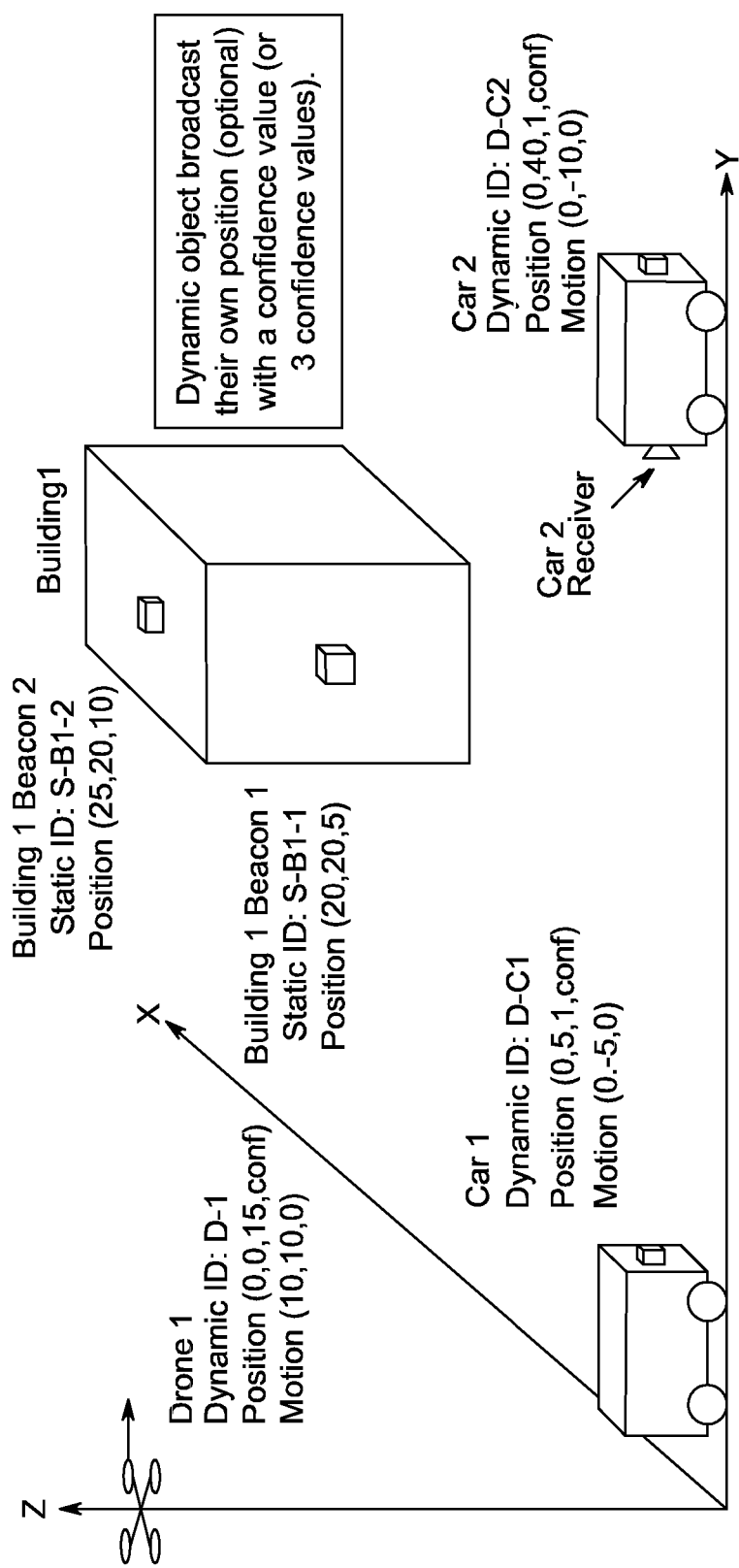

For Semi-Stationary Objects (e.g. a Construction Crane), for Example:
1. Type of beacon (semi-stationary)
2. Position of beacon (top, bottom, side (north, south, east, west))
3. ID of object
4. 3-dimensional motion vector For Ground-Based Vehicles (e.g., Cars), for Example:
1. Type of beacon (ground-based vehicle)
2. Position of beacon (top, front, rear, left, right)
3. ID of object
4. 3-dimensional motion vector For Water-Based Vehicles (Vessels), for Example:
1. Type of beacon (water-based vehicle)
2. Position of beacon (top, front, rear, left, right)
3. ID of object
4. 3-dimensional motion vector Examples of object information that can be transmitted from static and dynamic objects (such as building, drones, cars, etc.) via respective modulated light beacons are shown in FIGS. 13A, 13B. Static objects may broadcast their respective static ID and absolute position. Dynamic objects may broadcast their respective dynamic ID, position (plus confidence), and motion vector.

A unique ID of the object allows a receiver to track it easily, even if there is an intermediate occlusion and many objects are visible for the event-based vision sensor. Some (especially large) objects might use multiple beacons (see FIG. 3). By encoding the relative position of the beacons with respect to the attached object, the receiver can immediately recognize, if a vehicle is moving towards it or away from it, without decoding the motion vector. In case of a static object, e.g. a building, the knowledge about the position of the beacon may allow for easier planning around the obstacle (e.g.: fly north of northern edge of a building, over the top or under a bridge).

While the 2D event-based vision sensor 130 may give the receiver the angular position of an observed vehicle, the motion vector, together with the observed angular velocity of the vehicle, can be used to calculate its distance to the receiver. This way, a possible collision can be detected as soon as the vehicles are in visual range. No third party or infrastructure is required to make the detection.

Figure 7:
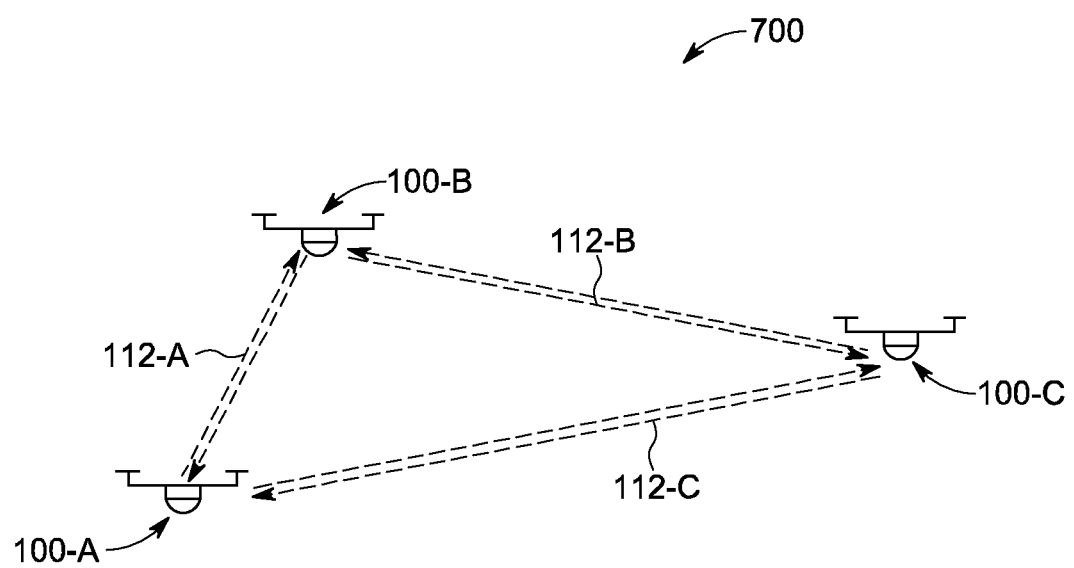
FIG. 7 illustrates a fourth collision avoidance system in accordance with the present disclosure.

FIG. 7 illustrates an example scenario with three UAV's 100-A, 100-B, 100-C.

FIG. 7 shows a multi-vehicle parallel communication potential of the proposed concept. Relative position can be determined by sending the absolute position of the moving vehicles 100-A, 100-B, 100-C in the respective modulated light signals 112-A, 112-B and 112-C. Alternatively, if the absolute position of the vehicle is not known, by sending the vehicles velocity in the signals 112-A, 112-B and 112-C and tracking the other vehicles over time, the change in the angular position with the received velocity can be used to estimate the relative position.

Depending on the field of view and field of illumination of sender and receiver, several sensors and receivers might be necessary, to ensure detection and emission in all necessary directions.

In addition to the collision avoidance between vehicles, embodiments of the proposed system can also be used as an optical positioning system by observing stationary objects (see FIGS. 4-6). If three stationary objects are in sight, the position can be determined easily from triangulation. If only two objects are in sight, the position can be determined from triangulation with the addition of the vehicles absolute heading. If only one stationary object is in line of sight, the position can still be determined using the vehicle's attitude and heading along with it's altitude.

Figure 8:
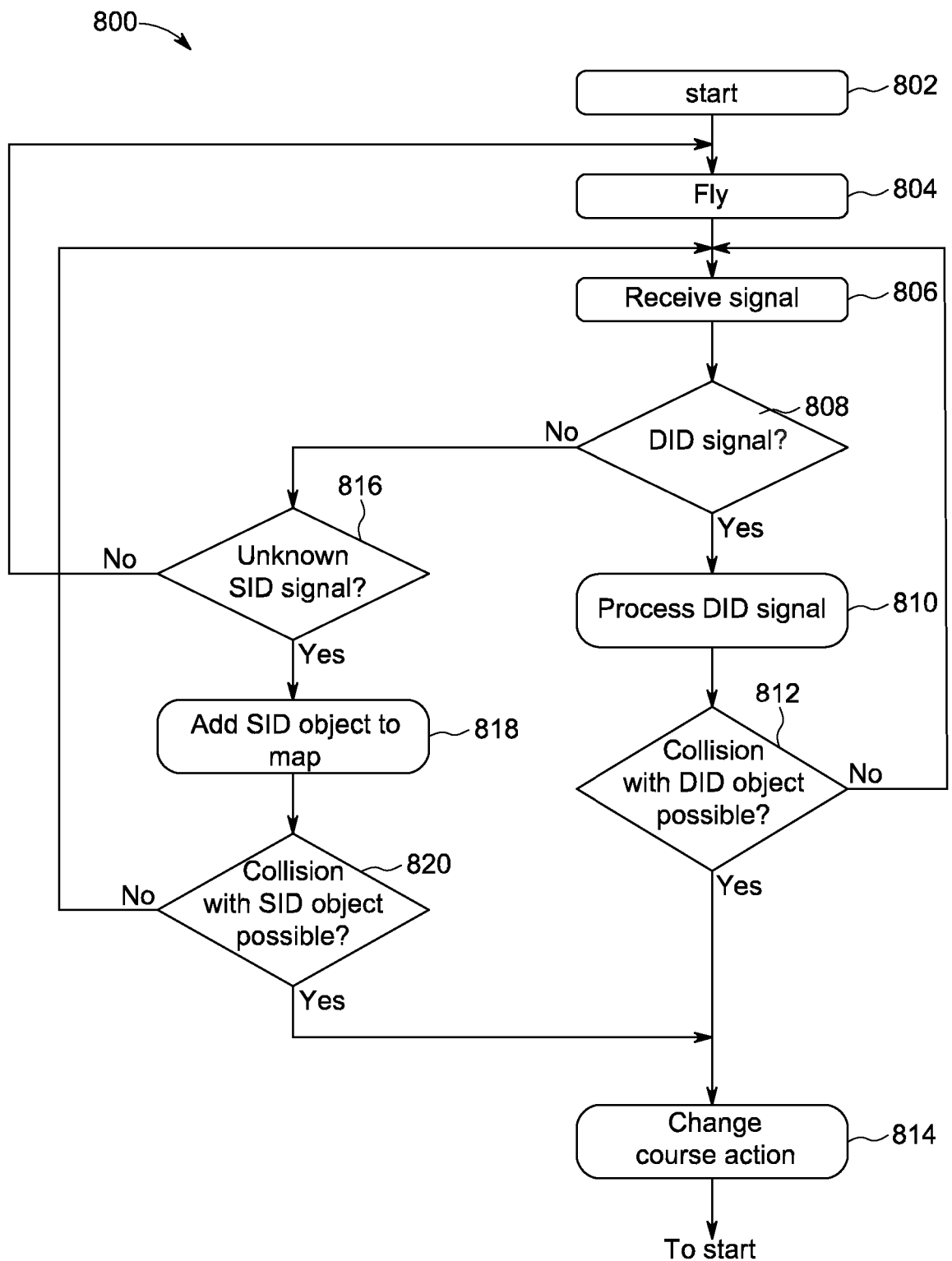
FIG. 8 shows a flowchart of a first collision avoidance method in accordance with the present disclosure.
Figure 9:
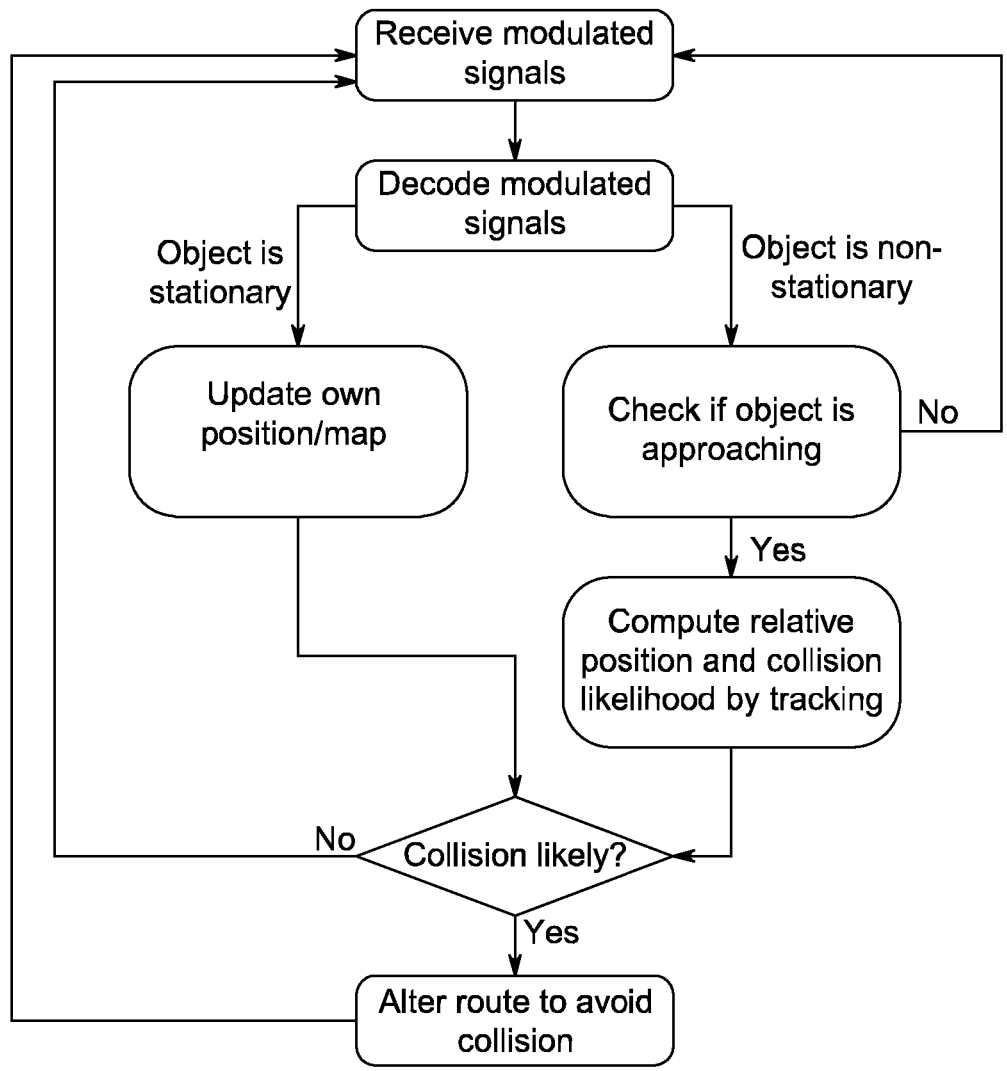
FIG. 9 shows a flowchart of a second collision avoidance method in accordance with the present disclosure.
Figure 10:
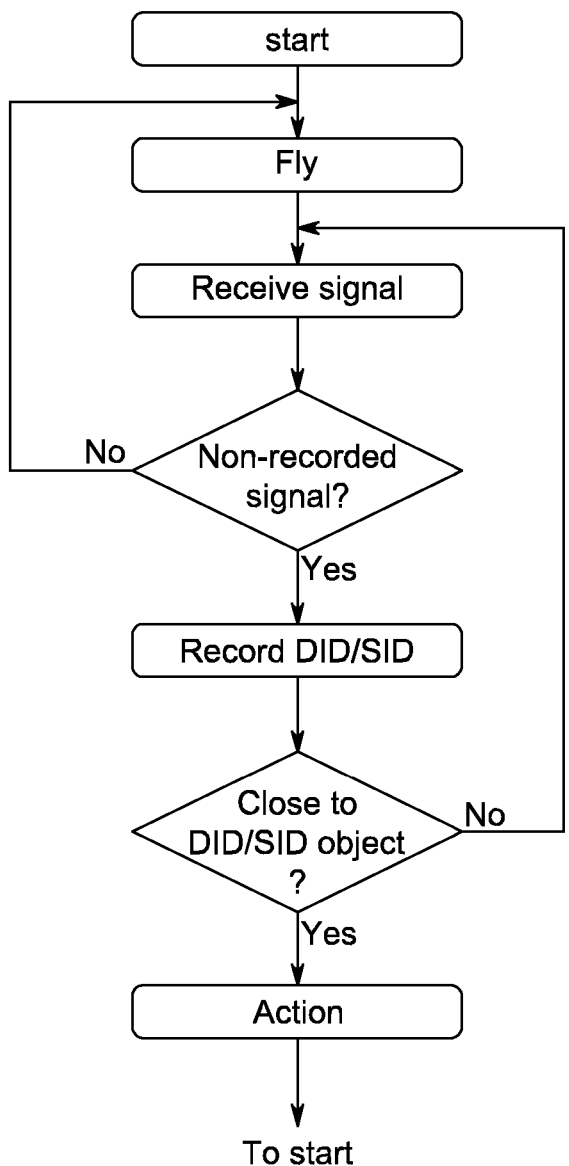
FIG. 10 shows a flowchart of a third collision avoidance method in accordance with the present disclosure.

FIG. 8 illustrates a flowchart of an example collision avoidance process 800 when operating a drone.

After starting the drone's flight at 802, the drone may fly according to its original flight plan at 804. In act 806, the drone may receive a modulated light beacon from another object with its event-based vision sensor and extract information about the other object, such as the type of the other object (e.g. dynamic, DID, or static, SID). In act 808, the drone may verify, based on the other object's ID, whether the other object is a dynamic or static object. In some implementations, dynamic objects may have higher priority than static objects since dynamic IDs (e.g., of another drone) should be processed first. Also, dynamic objects may have to be updated constantly in a flight map.

If the other object is identified as a dynamic object (e.g., another drone), the drone may process the information about the other dynamic object. This may include recording the other dynamic object in a flight map, for example, and determining its position/distance with respect to the other dynamic object in act 810. In subsequent act 812, drone may decide whether a collision with the other dynamic object is possible or not, e.g. whether the two objects are close. The decision in act 812 may be based on a predicted minimum distance, e.g. between the drone's trajectory and the other dynamic object's predicted trajectory by a threshold. The threshold could be a fixed value for DID and SID or a certain fixed value for DID bigger than the fixed value for SID. Another option would be a dynamic value dependent on the speed, or size and type of object and relative position (e.g. avoid turbulence above/below aerial vehicles). If the decision of act 812 yields that a collision with other dynamic object is possible, the original flight plan of the drone may be changed (act 814) by initiating a collision avoidance maneuver, e.g. by landing or by changing the drone's motion trajectory. Otherwise the drone may adhere to its original flight plan.

If the other object is not identified as a dynamic object in act 808, it may be checked in act 816 whether the SID of the other (static) object is already known (recorded) and hence acknowledged in the drone's flight plan. If this is the case the drone may stick to its original flight plan. If this is not the case, the other object's SID may be added (recorded) to a flight map in act 818. In subsequent act 820, the drone may decide whether a collision with the other static object is possible or not, e.g. whether the two objects are close. The decision in act 820 may be based on the predicted minimum distance, e.g. between the drone's trajectory and the static object. A threshold could be a fixed value SID or a certain fixed value for SID lower than the fixed value for DID. Another option would be a dynamic value dependent on the speed, or size and type of object. If the decision of act 820 yield that a collision with other static object is possible, the original flight plan of the drone may be changed (act 814) by initiating a collision avoidance maneuver, e.g. by landing or change the drone's motion trajectory. Otherwise the drone may adhere to its original flight plan.

Note that collision avoidance maneuvers may differ for avoiding static and dynamic objects. For example, it may be less useful to lower a flying altitude of the drone for circumventing a building. However, lowering a flying altitude of the drone may be very useful for circumventing another drone.

Figure 11:
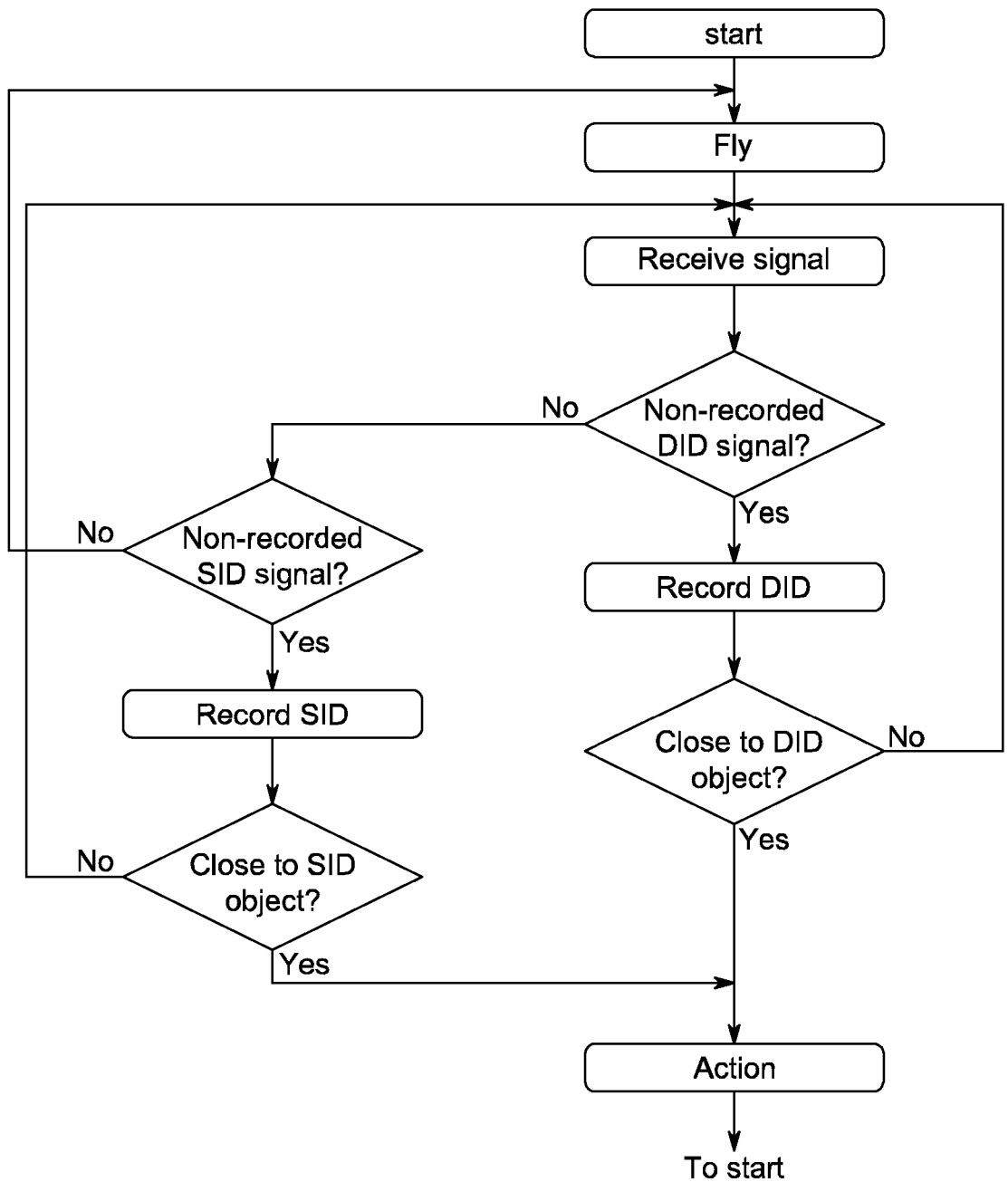
FIG. 11 shows a flowchart of a fourth collision avoidance method in accordance with the present disclosure.
Figure 12:
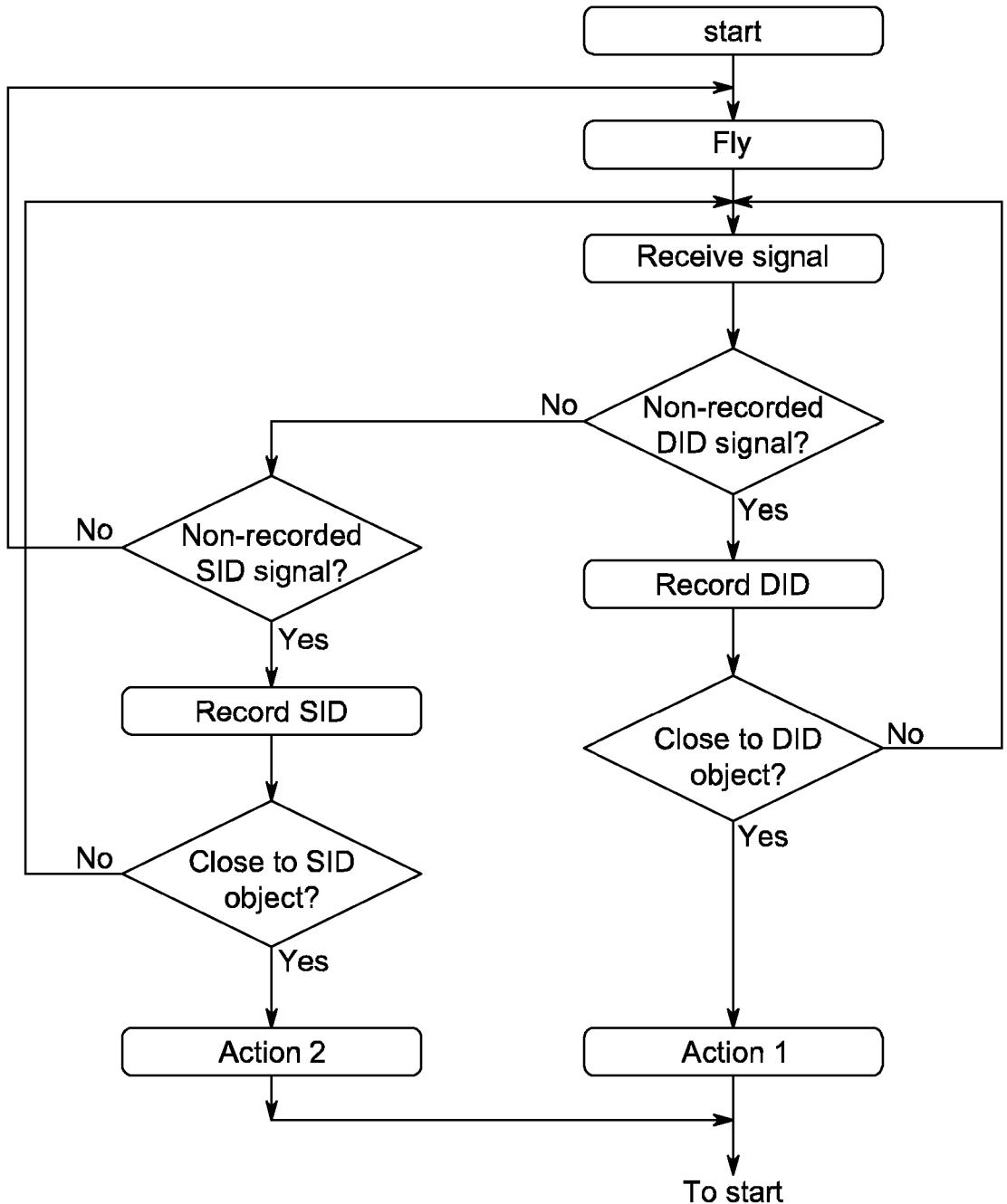
FIG. 12 shows a flowchart of a fifth collision avoidance method in accordance with the present disclosure.

Some variations of process 800 are shown in FIGS. 9 to 12. The example process of FIG. 9 also handles static and dynamic objects differently in that dynamic objects are handled with higher priority and may be continuously tracked to estimate their motion trajectory. The example process of FIG. 10 makes no difference between static and dynamic objects. That is, dynamic objects may have no priority over static objects. Here, it is merely decided whether another object is close. If yes, an action for collision avoidance is performed. The example process of FIG. 11 is similar to FIG. 8 in that static and dynamic objects are handled with different priority and in different processing paths. First, it is checked whether a received ID is a not yet recorded DID. If this is not the case, it is then checked whether the ID is a not yet recorded SID. If this is also not the case, the drone may stick to its original flight plan. In case the received ID corresponds to a non-recorded DID or SID, it gets recorded and respective proximity checks are performed. If the drone is too close to the newly recorded SID or DID object, a collision avoidance action is performed. The example process of FIG. 12 differs from FIG. 11 in that collision avoidance actions are different for SID objects and DID objects.

The proposed concept operates using line of sight, which means it may be very robust against interference. The use of 2D event-based vision sensors allows the parallel observation of multiple beacons, depending on the lateral resolution of the sensor. Because of this parallelism, there is no scheduling or centralized system required to coordinate the transmissions. The high angular resolution of 2D event-based vision sensors allows a very precise localization of the sender, which increases for close distance. This allows precise navigation around stationary objects with optical beacons, e.g. buildings, independent of GPS reception. Since the beacons of stationary objects may always broadcast the same information, they do not require online connectivity. A ground station with a receiver can be used as a redundant surveillance method for a UTM system (UTM: Universal Transverse Mercator), additionally to a network based management system or to cross check the validity of the information provided by an UAV over an RF channel.

Because of the special communication method (all parties may broadcast and receive), the proposed concept is independent from an infrastructure to negotiate between the different units. This makes the proposed concept robust against failures like power loss or technical defects. A standard evasive action may be defined in case of a possible collision. The collision avoidance may work completely decentralized this way.

Note that the present technology can also be configured as described below.

An object in accordance with the present disclosure comprises a light source configured to emit a light beacon, modulator circuitry coupled to the light source and configured to modulate a luminance of the light beacon based on a modulating useful signal carrying information about the object, and an event-based vision sensor configured to output an event signal in response to a detected change in luminance.

In some embodiments, the light source is configured to emit infrared or ultraviolet light.

In some embodiments, the modulator circuitry is configured to modulate the amplitude or duration of light emitted by the light source in accordance with the modulating useful signal.

In some embodiments, the information about the object comprises information on the type of object.

In some embodiments, the information about the object comprises information whether the object is a stationary or moving object.

In some embodiments, the information about the object comprises a unique identifier of the object.

In some embodiments, the information about the object comprises information on a position of the object.

In some embodiments, the information about the object comprises a motion vector of the object.

In some embodiments, the event-based vision sensor comprises a 2-dimensional pixel array configured to measure per-pixel luminance changes.

In some embodiments, the object further comprises processing circuitry configured to estimate a distance between an observed object whose (reflected or transmitted) modulated light beacon is detected by the event-based vision sensor and the object using the event signal in response to the detected modulated light beacon.

In some embodiments, the processing circuitry is configured to estimate the distance based on the object's motion vector and the observed object's angular position and/or velocity observed via the event-based vision sensor.

In some embodiments, the processing circuitry is configured to extract information about at least one observed object from the event signal, wherein the information about the observed object comprises information on an absolute position of the observed object, and to estimate an absolute position of the object using the absolute position of the at least one observed object and a line of sight between the object and the observed object.

In some embodiments, the processing circuitry is configured to compare the absolute position and/or a motion vector extracted from the information about the observed object with the observed object's position and motion vector observed via the event-based vision sensor relative to the objects own position.

In some embodiments, the processing circuitry is configured to estimate a location of the observed object based a location of one or more event-based vision sensor pixels triggering the event signal within a 2-dimensional pixel array.

In some embodiments, the light source is configured to emit the light beacon in a predefined direction and/or with a predefined shape.

In some embodiments, the object is a movable vehicle.

In some embodiments, the vehicle is an unmanned aerial vehicle.

In some embodiments, the object is a building.

A collision avoidance system comprises an object which includes a light source configured to emit a light beacon and modulator circuitry coupled to the light source and configured to modulate a luminance of the light beacon based on a modulating useful signal carrying information about the object. The system further comprises a vehicle which includes an event-based vision sensor configured to output an event signal in response to a detected change in luminance of the modulated light beacon, and processing circuitry configured to estimate a distance between the object and the vehicle using the event signal.

In some embodiments, the modulating useful signal carries information about whether the object is a stationary or moving object.

In some embodiments, the processing circuitry is configured to determine the position of the object from the event signal and to determine a distance between the object and the vehicle based on the position of the object and an estimated position of the vehicle.

In some embodiments, the processing circuitry is further configured to initiate a collision avoidance maneuver in case the distance falls below a threshold.

In some embodiments, the processing circuitry is configured to initiate collision avoidance maneuvers for identified moving objects with higher priority than for identified stationary objects.

A collision avoidance method includes emitting a modulated light beacon from an object, wherein a luminance of the light beacon is modulated based on a useful signal carrying information on a position of the object, detecting, by an event-based vision sensor of a vehicle, the modulated light beacon of the object and outputting an event signal in response to a detected change in luminance of the modulated light beacon, and estimating a distance between the object and the vehicle based on the event signal.

In some embodiments, the modulating useful signal carries information about whether the object is a stationary or moving object.

In some embodiments, the collision avoidance method includes determining the position of the object based on the event signal, and determining a distance between the object and the vehicle based on the position of the object and an estimated position of the vehicle.

In some embodiments, the collision avoidance method includes initiating a collision avoidance maneuver in case the distance falls below a threshold.

In some embodiments, the collision avoidance method includes initiating collision avoidance maneuvers for identified moving objects with higher priority than for identified stationary objects.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), Neuromorphic Processors, integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. An object, comprising
  a light source configured to emit a light beacon;
  modulator circuitry coupled to the light source and configured to modulate a luminance of the light beacon based on a modulating useful signal carrying information about the object including an orientation of the light source on the object; and
  an event-based vision sensor configured to output an event signal in response to a detected change in luminance.

2. The object of claim 1, wherein the light source is configured to emit infrared or ultraviolet light.

3. The object of claim 1, wherein the modulator circuitry is configured to modulate the amplitude or duration of light emitted by the light source in accordance with the modulating useful signal.

4. The object of claim 1, wherein the information about the object further includes at least one of information on the type of object, information whether the object is a stationary or moving object, a unique identifier of the object, information on a position of the object, a motion vector of the object.

5. The object of claim 1, wherein the event-based vision sensor includes a 2-dimensional pixel array configured to measure per-pixel luminance changes.

6. The object of claim 1, further comprising
  processing circuitry configured to estimate a distance between an observed object whose modulated light beacon is detected by the event-based vision sensor and the object based on the event signal in response to the detected modulated light beacon.

7. The object of claim 6, wherein the processing circuitry is configured to estimate the distance based on the object's motion vector and the observed object's angular velocity observed by the event-based vision sensor.

8. The object of claim 6, wherein the processing circuitry is configured to
  extract information about the observed object from the event signal, wherein the information about the observed object includes at least information on an absolute position of the observed object, and
  estimate an absolute position of the object using the absolute position of the observed object and a line of sight between the object and the observed object.

9. The object of claim 6, wherein processing circuitry is configured to compare the absolute position and/or a motion vector extracted from the information about the observed object with a relative position and motion vector of the observed object observed via the event-based vision sensor.

10. The object of claim 6, wherein the processing circuitry is configured to estimate a location of the observed object based a location of one or more event-based vision sensor pixels triggering the event signal.

11. The object of claim 1, wherein the light source is configured to emit the light beacon in a predefined direction and/or with a predefined shape.

12. The object of claim 1, wherein the object is one of a movable vehicle, an unmanned aerial vehicle, or a building.

13. A collision avoidance system, the system comprising
  an object, including
    a light source configured to emit a light beacon;
    modulator circuitry coupled to the light source and configured to modulate a luminance of the light beacon based on a modulating useful signal carrying information about the object including an orientation of the light source on the object;
the system further including
a vehicle, including
an event-based vision sensor configured to output an event signal in response to a detected change in luminance of the modulated light beacon; and
processing circuitry configured to estimate a distance between the object and the vehicle using the event signal.

14. The collision avoidance system of claim 13, wherein the processing circuitry is further configured to:
determine whether the object is stationary or moving from the modulating useful signal; and
determine different collision avoidance maneuvers for moving objects than for stationary objects.

15. A collision avoidance method, the method comprising
emitting a modulated light beacon from an object, wherein a luminance of the light beacon is modulated based on a useful signal carrying information on a position of the object including an orientation of the light beacon on the object;
detecting, by an event-based vision sensor of a vehicle, the modulated light beacon of the object and outputting an event signal in response to a detected change in luminance of the modulated light beacon; and
estimating a distance between the object and the vehicle based on the event signal.

16. The collision avoidance method of claim 15, wherein the modulated light beacon carries information about whether the object is a stationary or moving object.

17. The collision avoidance method of claim 15, further comprising
determining the position of the object based on the event signal, and
determining a distance between the object and the vehicle based on the position of the object and an estimated position of the vehicle.

18. The collision avoidance method of claim 15, further comprising initiating a collision avoidance maneuver in case the distance falls below a threshold.

19. The collision avoidance method of claim 15, further comprising initiating collision avoidance maneuvers for identified moving objects with higher priority than for identified stationary objects.

20. The collision avoidance method of claim 16, further comprising:
determining whether the object is stationary or moving from the modulated light beacon; and
determining different collision avoidance maneuvers for moving objects than for stationary objects.

* * * * *